May 23, 1950        P. BELGERI        2,508,350

THERMOSTATIC REGULATOR FOR ELECTRIC HEATING ELEMENTS

Filed Feb. 17, 1948

Inventor:
P. Belgeri
By E. F. Wenderoth
Atty

Patented May 23, 1950

2,508,350

UNITED STATES PATENT OFFICE 2,508,350

THERMOSTATIC REGULATOR FOR ELECTRIC HEATING ELEMENTS

Paul Belgeri, Geneva, Switzerland, assignor to Brevets et procédés Pyror S. A., Geneva, Switzerland, a corporation of Switzerland Application February 17, 1948, Serial No. 8,938
In Switzerland February 21, 1947

2 Claims. (Cl. 200—122)

This invention relates to a thermostatic regulator for electric heating element, in which the deformations of a bi-metallic element are used to operate a mercury switch controlling the circuit of the said heating element.

This regulator is characterized in that the said switch is carried by an oscillating member, itself mounted on a support which also oscillates, in that the movement of the oscillating member is controlled by the deformations of the bi-metallic element and in that the angular position of the oscillating support is adjusted by hand control, the whole being arranged in such manner that the hand adjustment of the oscillating support permits of varying the length of the time intervals between the periodic closing and opening of the said switch.

The accompanying drawing shows, by way of example, one embodiment of the regulator according to the invention.

Figure 1:
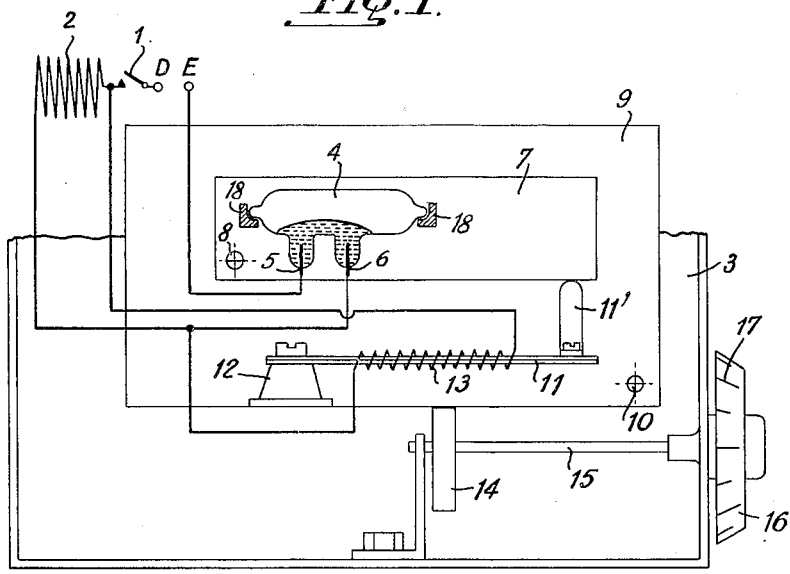
Fig. 1 is an elevational diagrammatic view of this embodiment.

The regulator constituting the object of the invention provides for the control of a heating power (such as an electric heating element) by periodical interruptions of the current, the alternating periods of interruption and operation being automatically determined by the deformations of a bi-metallic element provided with an electric resistance constituted by a winding inserted in the controlled circuit, i. e., the circuit of the electric heating element. I indicates a general hand operated switch, inserted between a terminal D of current supply from a network for example, and the heating element of a working apparatus shown as an electric resistance 2. In the regulator illustrated generally at 3, a mercury switch 4 is provided, the electrodes 5 and 6 of which are respectively connected to the terminal E of the network and to the heating resistance 2. This switch 4 is mounted on bearings 18 provided on a member 7 capable of oscillating about an axis 8 of a support 9 also capable of oscillating about an axis 10 secured to the frame of the regulator 3. The oscillating member 7 is controlled by the deformations of bi-metallic element 11 one end of which is secured to a bracket 12 integral with the support 9, the other end, which is movable, operating by means of an element 11' fixed on the said oscillating member 7. 13 indicates the heating resistance of the element 11 and which is connected in parallel with the resistance 2 of the working apparatus. This resistance 13 could also be series connected which would vary the control of the heating intensity as will be explained hereafter. The oscillating support 9 rests on a cam 14 secured to a shaft 15 on which is fixed a hand operated knob 16 provided with a scale 17 turning in front of a fixed guide mark not shown.

The operation of the regulator described is as follows:

Supposing the switch to be closed, the current flows for example from D to E through the heating resistance 2, the resistance 13 of the bi-metallic element 11 and the mercury connecting the electrodes 5 and 6.

The movable end of the element 11 moves under the effect of heat produced by the passage of the current through the winding 13, and causes the member 7, resting on the element 11, to oscillate. The mercury of the switch 4 is set in motion and the current is broken between the two electrodes 5 and 6. In order to realize a more or less rapid action of the bi-metallic element on the switch 4, the initial position or position of rest of the oscillating support 9 may be varied by acting on the cam by means of the knob 16.

It will be noted that the control realized by the regulator herein described (expressed in percentage of heating power) is not directly proportional to the angular displacements of the control knob 16.

Figure 2:
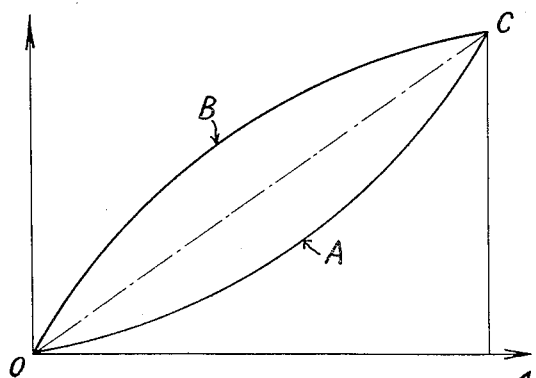
Fig. 2 shows a diagram illustrating two different controls of the temperature of the working apparatus.

In the diagram shown in Fig. 2, the ordinates correspond to the percentage of the heating power and the abscissae to the angular displacements of the control knob 16.

The curve A shows, for example, that the heating of the working apparatus increases slowly at the outset and more rapidly towards the end of the angular displacement of the knob 16. The sensibility of control is therefore greater at low intensity, this being of importance when the intensity of the source of heat must be that corresponding to the simmering of a dish, for example. This advantage becomes, on the other hand, a disadvantage if the intensity of the source of heat must be that of an oven. In this case, the shape of the curve must be similar to the B curve (Fig. 2) that is to say that the sensibility control must be greater at the upper part of the curve. The intersecting point C of the curves A and B corresponds to 100% of the heating power. For operation, under one or the other of the intensities, with the automatic regulator described, it is sufficient either to place the bulb of the switch 4 in the position shown or to reverse its position end to end in the bearings 18, owing to the dissymmetrical shape of the bulb.

By connecting the heating resistance 13 of the thermo-couple 11 in series with the heating resistance 2 of the working apparatus, a control is realized shown by the curve B and by switching this resistance 13 in parallel with the resistance 2, the control realized is the one shown by the curve A.

What I claim is:

1. A thermostatic regulator comprising an oscillatably mounted support, an oscillating member mounted on said support, a mercury switch on said oscillating member, manual means for varying the angular position of said support, a bi-metallic element mounted at one end thereof on said support, energizing means for said element, means on the movable end of said element for actuating said oscillating member for making and breaking contact in said mercury switch by oscillation of said member, said manual means upon adjustment to vary the angular position of said support varying the angular position of said mercury switch whereby the period of time intervals between the periodic closing and opening of said mercury switch may be varied.

2. In a thermostatic regulator as claimed in claim 1, a projection on the free end of said bi-metallic element in direct contact with said oscillating member and comprising the actuating means therefor, said manual means comprising a rotatable shaft and a cam on said shaft in contact with said support.

PAUL BELGERI.

REFERENCES CITED

The following references are of record in the file of this patent:

UNITED STATES PATENTS

| Number | Name | Date |
| --- | --- | --- |
| 1,644,433 | Parks | Oct. 4, 1927 |
| 1,651,629 | Phelan | Dec. 6, 1927 |
| 1,928,907 | Noble | Oct. 3, 1933 |
| 2,012,428 | Hollinshead | Aug. 27, 1935 |
| 2,088,728 | Stranszky | Aug. 3, 1937 |
| 2,224,596 | Desfachelles | Dec. 10, 1940 |